H. K. PORTER.
METAL CUTTING TOOL.
APPLICATION FILED JAN. 23, 1915.
1,146,021.
Patented July 13, 1915.
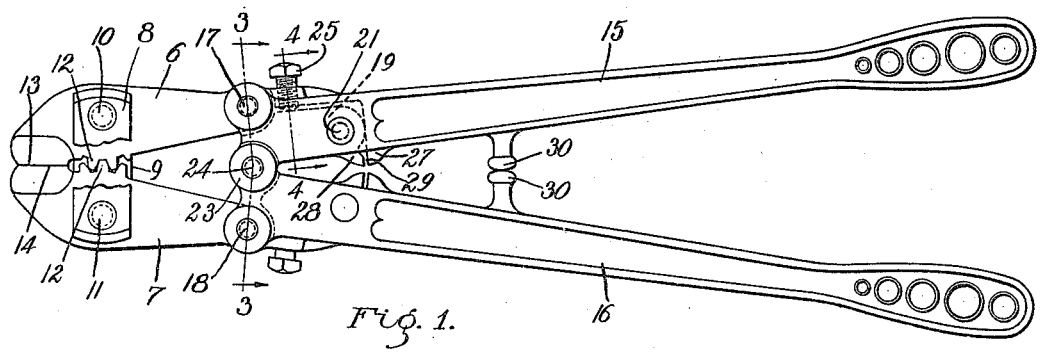
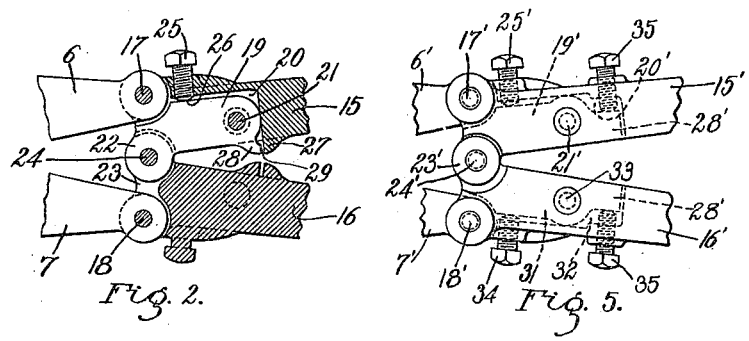
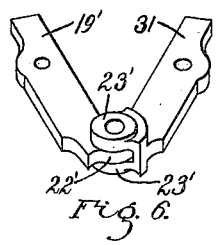
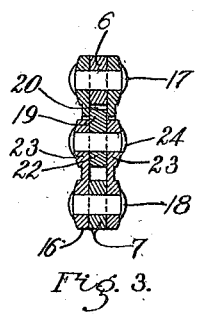
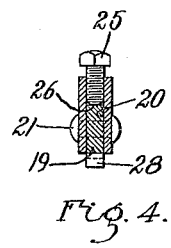
Witnesses:
Herman B. Hoffman.
Leonard A. Powell.
Inventor:
Henry K. Porter
By his attorney, Charles J. Gooding
COLUMBIA PLANOGRAPH CO., WASHINGTON, D. C.

UNITED STATES PATENT OFFICE.

HENRY K. PORTER, OF BOSTON, MASSACHUSETTS.

METAL-CUTTING TOOL.

1,146,021. Specification of Letters Patent. Patented July 13, 1915.

Application filed January 23, 1915. Serial No. 4,044.

*To all whom it may concern:*

Be it known that I, HENRY K. PORTER, a citizen of the United States, residing at Boston, in the county of Suffolk and State of Massachusetts, have invented new and useful Improvements in Metal-Cutting Tools, of which the following is a specification.

This invention relates to improvements in tools for cutting metal and more particularly to the class of tools known as bolt clippers or cutters, an example of which is illustrated in a U. S. Patent No. 226,190 granted to me April 6, 1880.

The object of this invention is to provide a powerful tool which may be manufactured at a moderate cost in order to supply the demand for a tool adapted to be used only occasionally, thereby requiring but a small amount of adjustment to take up for wear between the pivots of the several moving parts of the device and by the grinding of the cutting edges thereof.

The invention consists in the combination and arrangement of parts whereby the above objects and certain other objects hereinafter appearing may be attained, as set forth in the following specification and particularly pointed out in the claim.

Referring to the drawings, Figure 1 is a plan view of a cutting tool embodying the preferred form of my invention. Fig. 2 is a detail plan partly in section, of portions of the handles and cutter levers illustrating the manner in which said levers are adjusted relatively to each other. Fig. 3 is a section taken on line 3—3 of Fig. 1. Fig. 4 is a section taken on line 4—4 of Fig. 1. Fig. 5 is a detail plan view of coöperating portions of a pair of handles and cutter levers illustrating another method of providing adjustment between said cutter levers and said handles. Fig. 6 is a detail perspective view of the adjusting members shown in Fig. 5.

Like numerals refer to like parts throughout the several views of the drawings.

In the drawings, 6 and 7 are cutter levers, which are pivotally connected to each other by a pair of links 8 and 9 secured by rivets 10 and 11 to the cutter levers 6 and 7 respectively. The cutter levers 6 and 7 are also provided with intermeshing gear teeth 12, 12 provided for the purpose of insuring uniform pivotal movements between said cutter levers. The levers 6 and 7 are further provided with coöperating cutting edges 13 and 14. A pair of handles 15 and 16 are pivotally connected to the cutters 6 and 7 respectively by a pair of pivots, preferably rivets, 17 and 18.

In the preferred form of this invention the handles 15 and 16 are preferably connected together by an adjusting member 19, which member is arranged within a slot 20 cut in the end of one of the handles, preferably the handle 15 and adjacent the pivot 17, said slot extending inwardly and having an opening in the side of said handle adjacent the other handle. The adjusting member 19 is tightly arranged in said slot 20 so as to prevent any unintentional movement thereof relatively to said handle.

A pivot 21, preferably a rivet, extends through the handle 15 and the adjusting member 19 at a substantial distance from the pivot 17, pivotally connecting said adjusting member with said handle. The opposite end of the adjusting member 19 is preferably provided with an ear 22, which ear is preferably interposed between a pair of ears 23, 23 preferably formed integral with the handle 16 and intermediate the pair of pivots 17 and 18. A pivot 24, preferably a rivet, extends through the ears 22 and 23 and pivotally connects said adjusting member 19 with said handle 16.

Means are provided for rocking the adjusting member 19 upon its pivot 21 whereby the pivots 17 and 18 may be moved apart in order to take up for wear between the pivots 17 and 18 and their several connecting members and also for the grinding and regrinding of the cutting edges of the cutter levers 6 and 7. This means preferably consists of a screw 25 arranged transversely of the handle 15 adjacent the pivot 17 and engaging the edge 26 of the adjusting member 19, said screw engaging said adjusting member intermediate the pivots 21 and 24.

To operate the device hereinbefore described, the handles 15 and 16 are swung outwardly in opposite directions substantially about the pivot 24, causing the pivots 17 and 18 to draw together and thus separate the cutting edges 13 and 14 of the cutter levers 6 and 7 and permitting the work to be inserted between said cutting edges. The handles are then drawn together and the work severed.

It will be obvious that during the outward movements of the handles 15 and 16, in so far as the above description is concerned, there would be nothing to prevent the handle 15 from swinging about the pivot 21 rather than about the pivot 24, provided said member should become loose in said slot, and thus withdraw said screw 25 from contacting with the adjusting member 19. To limit such an action as this during said opening movement, a pair of stops 27 and 28 have been provided on the handle 15 and the adjusting member 19 respectively, which coöperate at a predetermined time to prevent a further pivotal movement of said adjusting member on said handle. A certain amount of pivotal movement however is necessary and the amount permitted in the present case is indicated by the space 29 between said stops when the several pivots and members are in their normal closed position, as shown in Figs. 1 and 2. The space 29 is sufficient to provide all the adjustment necessary between the adjusting member 19 and the handle 15. The contraction of the handles 15 and 16 during the cutting operation is limited by the usual stops 30, 30, thereby preventing said handles from being drawn close enough together to pinch the fingers of the operator manipulating the device.

In the form of the device hereinbefore described but a single adjusting member has been provided and that member pivotally secured to the ears 23 which, as has been stated, are preferably formed integral with the handle 16. This construction provides sufficient adjustment between the cutter levers for any ordinary amount of wear, but when it is desired to increase this adjustment, an adjusting member, similar to the adjusting member 19, Figs. 1 and 2, may be provided upon the other handle and such a construction is illustrated in Figs. 5 and 6 in which 6′ and 7′ are the cutter levers, partly broken away to save space in the drawings, and 15′ and 16′ are the handles which are also partly broken away.

The handle 15′ is provided with an adjusting member 19′, similar to that shown in Fig. 2, having an ear 22′ which however engages a pair of ears 23′, 23′, formed upon another adjusting member 31 arranged in a slot 32 in the handle 16′, similar to the slot 20′ in the handle 15′. A pivot 24′ connects the ears 22′ and 23′ together, while pivots 21′ and 33 connect the adjusting members 19′ and 31 to their respective handles. Each of the handles 15′ and 16′ is provided with an adjusting screw 25′ and 34 respectively similar to the adjusting screw 25 of Figs. 1 and 2 and operated in the same manner, thereby increasing the amount of adjustment between the pair of pivots 17′ and 18′.

To still further increase the adjustment between the pivots 17′ and 18′, the members 19′ and 31 are each provided with a stop 28′, similar to and for the same purpose as is the stop 28 of the member 19. These stops are however adapted to engage screws 35, 35 adjustably arranged in their respective handles, which screws may be set in such a relation to the screws 25 and 34 that there will be no relative movement between the adjusting members and their respective handles during the outward movements of said handles, but as said adjusting screws 25′ and 34 are operated to move their adjusting members relatively to their respective handles, the screws 35 may also be moved to permit such an adjustment, and to take up any looseness caused by such an adjustment.

By providing the slots in the handles for the adjusting member it will be obvious that a greater amount of material will be left within which to contain the adjusting screw 25 or 34 with the result that the tool will be very strong.

Having thus described my invention what I claim and desire by Letters Patent to secure is:

A cutting tool having, in combination, a pair of cutter levers pivotally connected to each other, a pair of handles pivotally connected to said cutter levers, one of said handles having a slot adjacent to the connection of said handle with its cutter lever, said slot extending from the inner edge thereof transversely of said lever for the greater portion of its width, the outer edge of said lever being solid, an adjusting member arranged within said slot and substantially concealed therein, a pivot extending through said slotted handle and said adjusting member, a second pivot adapted to connect said adjusting member with the other of said handles, an adjusting screw arranged in the outer closed edge of said handle adapted to engage the adjacent edge of said adjusting member, a stop on said adjusting member, and a stop on said handle containing said adjusting member adapted to coöperate with said first named stop to limit the adjusting movements of said adjusting member relatively to said handle.

In testimony whereof I have hereunto set my hand in presence of two subscribing witnesses.

HENRY K. PORTER.

Witnesses:
  SYDNEY E. TAFT,
  MARGARET E. HORN.

Copies of this patent may be obtained for five cents each, by addressing the "Commissioner of Patents, Washington, D. C."